United States Patent
Pannier et al.

(10) Patent No.: US 10,025,562 B2
(45) Date of Patent: Jul. 17, 2018

(54) COLLABORATIVE DEVELOPMENT OF A WEB-BASED SERVICE

(71) Applicant: POWELL SOFTWARE SAS, Viroflay (FR)

(72) Inventors: Raphael Pannier, Viroflay (FR); Frédéric Lepors, Viroflay (FR)

(73) Assignee: POWELL SOFTWARE SAS, Viroflay (FR)

(*) Notice: Subject to any disclaimer, the term of this patent is extended or adjusted under 35 U.S.C. 154(b) by 0 days.

(21) Appl. No.: 15/267,929

(22) Filed: Sep. 16, 2016

(65) Prior Publication Data

US 2018/0081638 A1    Mar. 22, 2018

(51) Int. Cl.
| | |
|---|---|
| G06F 9/44 | (2018.01) |
| G06F 8/30 | (2018.01) |
| G06F 8/20 | (2018.01) |
| G06Q 10/10 | (2012.01) |
| G06F 8/71 | (2018.01) |

(52) U.S. Cl.
CPC ............... *G06F 8/30* (2013.01); *G06F 8/20* (2013.01); *G06F 8/24* (2013.01); *G06F 8/71* (2013.01); *G06F 9/44* (2013.01); *G06Q 10/101* (2013.01)

(58) Field of Classification Search
None
See application file for complete search history.

(56) References Cited

U.S. PATENT DOCUMENTS

| | | | | |
|---|---|---|---|---|
| 6,026,433 A | * | 2/2000 | D'Arlach | G06F 17/24 707/999.01 |
| 7,870,535 B2 | | 1/2011 | Rippert et al. | |
| 2008/0141245 A1 | * | 6/2008 | Berstis | G06F 21/125 717/178 |
| 2008/0189679 A1 | | 8/2008 | Rodriguez et al. | |
| 2009/0030918 A1 | | 1/2009 | Lowry et al. | |
| 2014/0068545 A1 | | 3/2014 | Lehmann et al. | |
| 2014/0149187 A1 | * | 5/2014 | Farhat | G06Q 10/0637 705/7.36 |
| 2014/0282357 A1 | | 9/2014 | Padaliak et al. | |
| 2015/0234840 A1 | | 8/2015 | Redenbach et al. | |

OTHER PUBLICATIONS

Hupfer et al., "Introducing collaboration into an application development environment", CSCW, Chicago, Illinois, USA, 2004, pp. 21-24.
European Search Report with regard to the EP Patent Application 17190211.7., Oct 2017, p. 1-2. QN.

\* cited by examiner

*Primary Examiner* — Qamrun Nahar
(74) *Attorney, Agent, or Firm* — BCF LLP

(57) ABSTRACT

Collaborative development of the web-based service on a developer system and client system have been described. The client device and the developer system is subscribed to a web service for providing a collaborative environment, so that multiple user have access to the web-based service being developed. In one implementation, a managing engine identifies the inputs for changing/updating a functionality of a web-based service. The managing engine identifies the design requirement of the inputs provided. The managing engine requests a component package from a managing server. The managing server provides the components package to the managing engine for implementing the changes or updates on the web-based service, based on the inputs provided.

16 Claims, 5 Drawing Sheets

COLLABORATIVE DEVELOPMENT OF A WEB-BASED SERVICE

FIELD OF INVENTION

The present subject matter relates to collaborative development of any web-based service.

BACKGROUND

For development of any web-based services, such as a website, or a web portal, inputs from a client may be received by the web-based service development team. The web-based service team develops various applications for the client based on the inputs received. Once the changes are incorporated, the revised application and the changes implemented may be shared with the client. The client provides certain inputs regarding the web-based service and the web-based service development team again works on the web-based service for incorporating the changes. Therefore, the development of web based service is typically a cyclic process.

SUMMARY

This summary is provided to introduce concepts related to collaborative development of the web-based service for incorporating the inputs in a real-time. This summary is not intended to identify essential features of the claimed subject matter nor is it intended for use in determining or limiting the scope of the claimed subject matter.

In one implementation, a system with a managing engine for collaborative development of web-based services is described. The managing engine has a managing server associated with it, the managing engine is used to access a web service, via the managing server, which provides assemblies that are to be used for collaborative development of the web-based service. Inputs regarding the web application interface are received on interface of the system and provided to the managing engine. As the inputs are received the managing server requests a component package corresponding to the inputs received. The component package is provided to the managing engine in real-time, wherein the component package may comprise executable modules which may further comprise source files accessed from a content distribution network (CDN) and web layouts available on the web service. The executable modules may be available in various forms, such as JavaScript, HTML, JSS CSS, etc.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. It should be appreciated by those skilled in the art that the diagrams herein represent views of illustrative devices embodying the principles of the present subject matter.

DESCRIPTION OF EMBODIMENTS

Figure 1:
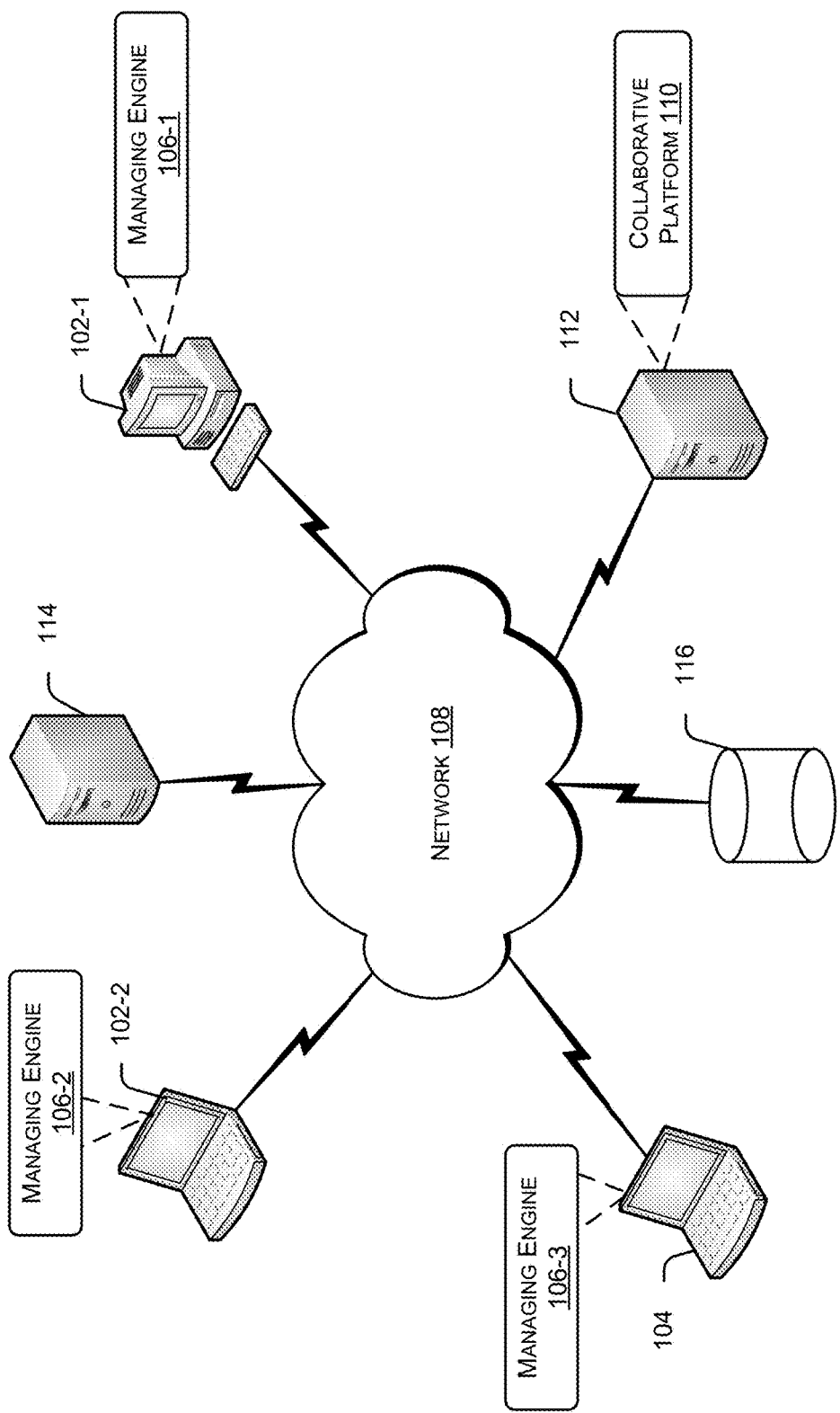
FIG. 1 illustrates a computing environment for collaborative development of web-based services, according to an example of the present subject matter.

Typically, in a web-based service development cycle, inputs from a client are obtained and then a group of developers design a web-based service for the client. During the course of web-based service development, while the web-based service is being designed and created, it may be periodically presented to the client for feedback. The developers, after receiving inputs from the client, may work on the web-based service to incorporate the changes. The web-based service development cycle may have many iterations based on the inputs received from the client during the development phase. Generally, such incorporation of changes is done manually. For example, changes in functionalities of the web-based services may have to be determined manually. Manual incorporation of changes and suggestions introduces latency and subjectivity. Furthermore, generally known approaches also do not allow all developers to incorporate inputs in real-time, as and when they are being provided by the client. Depending on the number of changes suggested or number of cycles required for developing the web-based services, finalizing the web-based services may take additional time, and hence may become costly to develop.

Approaches for collaborative development of a web-based service are described. In an embodiment of the present subject matter, development of such web-based services is affected using a real-time collaboration platform. The web-based service may be considered as any application implementing any functionality over a communication network such as the Internet. Although the present description is provided with respect to web-based services, other computer implemented applications may also be within the scope of the present subject matter without any limitations.

Returning to the present subject matter, it may be the case that a web-based service is being developed by one or a group of developers. As also indicated briefly, during the course of developing the web-based services, the developers (referring interchangeably to either one or a group of developers) may periodically share the web-based services as being developed with the client, through a collaborative platform. Examples of a collaborative platform include, but are not limited, Microsoft® Sharepoint®. It would be noted that Microsoft® Sharepoint® may either be available as an individual application, or may be available as bundle with Microsoft 365 package. The developers, as mentioned in the description can be a user with a developing competence, or may be a user with a functional competence. Users with developing competence may make changes in the web-based services, while the users with functional competence may provide suggestive changes for the web-based services.

In one example, the client may review the web-based services through the collaborative platform. While reviewing, the client may provide one or more suggestive changes in the form of inputs. In the present example, the inputs indicating the suggested changes may be provided through the collaborative platform using the interface of engines described in the present subject matter. The inputs may be provided in real-time as the client is reviewing and assessing the web-based services.

In an example, the web-based service may be deployed on the Microsoft® Sharepoint® platform, and may be accessed by the client for reviewing.

Once the inputs are received from the clients, one or more modules executing on the client device may further analyze the inputs to determine one or more design requirements which have to be incorporated in order to conform to the inputs. The design requirements may be considered as one or more computer implemented functionalities or aspects which are to be incorporated. Based on the identified design requirements, one or more component packages for implementing the computer implemented functionalities are determined. The component packages may be considered as collection of executable code or digital data which when executed or utilized, affect the change in conformance with the design requirement. For example, component packages may include one or more libraries. In an example, the libraries may be written in any know language, such as JavaScript, CSS, and HTML. It should be noted that the identification and determination of the appropriate component packages is done while the client is providing their inputs on the web-based services being shared through the collaborative platform.

The component packages may be stored in a network accessible storage location. Once the appropriate component packages are identified, they may be retrieved from their network storage location as and when the inputs are being provided by the client to the developer. In an example implementation of the present subject matter, the component package may include components based on different formats, such as HTML, JSS, JavaScript and CSS. Depending upon the requirements of the web-based services, the component package may include components in the required format. For instance, if the web-based services requires the component package in HTML form, the component package is assembled in HTML form and provided. Thereafter, the component packages may be implemented to affect the changes in conformance with the design requirements. The changes when reflected may be visible to the client in real-time through the collaborative platform. If the changes are acceptable, the update to the web-based services may be committed to the web-based services.

In an example implementation where the collaborative platform is Microsoft® Sharepoint®, the network accessible location may be hosted on the platform service of Microsoft®, such as Microsoft® Azure.

As would be understood, since the inputs are received in real-time within the collaborative platform, the appropriate component packages for affecting the changes may be determined in real-time. The changes also may be done and shared in real-time with the client based on which updates may be committed. In this manner, multiple cycles involving sharing changes based on inputs and then sharing and revising again when such changes are not as per what was desired, may be avoided. In this manner, the present systems allow that inputs may be received in real-time based on which component packages reflecting the desired design requirements are determined and implemented. If the changes are acceptable, the update may be committed. This results in a faster and more efficient development cycle. The present subject matter in addition to the advantages as described above also allows multiple developers to work in parallel to develop the web-application service.

The above techniques are further described with reference to FIG. 1 to FIG. 5. It should be noted that the description and the figures merely illustrate the principles of the present subject matter along with examples described herein, and should not be construed as a limitation to the present subject matter. It is, thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a computing environment for collaborative development of web-based services, according to an example of the present subject matter. The computing environment includes developer systems 102-1 and 102-2 and a client system 104, communicating with each other via a network 108.

The developing systems 102-1 and 102-2, may be utilized by development teams for developing web-based services, while the client system 104 may be used by clients for reviewing the developed web-based services. For the ease of reference, the developing systems 102-1 and 102-2 have been commonly referred to as developing systems 102, hereinafter.

The developing systems 102 may include any computing systems, such as desktop computers, hand-held computing devices, laptops portable computers, network computers, or wireless handheld devices, such as mobile phones, personal digital assistant (PDA), smart phones dash top mobiles, and multi-media enabled phones, which are capable of communicating with the client device 104, through the networks 108

Similarly, the client device 104 may also include any computing device such as a desktop computer, a hand-held computing device, a laptop a portable computer, a network computer, or a wireless handheld device, such as mobile phones, personal digital assistants (PDA), smart phones, dash top mobiles, and multi-media enabled phones.

In an example implementation of the present subject matter, the developing systems 102 and the client system 104 may each include a managing engine, such as the developing system 102-1 may include a managing engine 106-1, and the developing system 102-2 may include a managing engine 106-2. Similarly, the client device 104 may also include a managing engine 106-3. For the ease of reference, the managing engines 106-1, 106-2, and 106-3 have been commonly referred to as managing engines 106. Each managing engine may assist the developing systems 102 and the client device 104 in collaborative development of the web-based services.

In an example implementation of the present subject matter, the developing systems 102, and the client system 104, are subscribed to a collaborative platform 110. The collaborative platform 110 may provide a platform on which the web-based services may be deployed and shared with different users in real time. The collaborative platform 110 may include any platform capable of allowing deployment of web-based services, and enabling sharing of the web-based services in real-time, such as SharePoint collaborative platform 110.

As described earlier, the web-based service is deployed on the collaborative platform 110, and the client accesses the web-based service on the collaborative platform 110, via the network 108. In an example implementation of the present subject matter, the network 108 may be a wireless or a wired network, or a combination thereof. The network 108 may be a collection of individual networks, interconnected with each other and functioning as a single large network, for example, the internet or an intranet. Few or all of the network 108 may be implemented as one of the different types of networks, such as local area network (LAN), wide area network (WAN), Wireless Local Area Network (WLAN), and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other.

In one example, the developing systems 102 and the client device 104 may use General Packet Radio Service (GPRS) along with other networks 108 for communicating with each other. In addition, the network 108 may be implemented as individual networks including, but are not limited to, 3GPP Long Term Evolution (LTE), Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). In other words, the network 108 may include cellular telecommunication networks, wired networks, or wireless networks other than cellular telecommunication networks, or a mix thereof.

In an example, the collaborative platform 110 may be Microsoft® Sharepoint®, available in the Microsoft 365 package. The web-based service is deployed on the client's Microsoft® Sharepoint® account and the client may access the web-based service through Microsoft® Sharepoint®.

The managing engine 106 provides the interface for providing the feedback or inputs indicating changes in the web-based service. Further, in an example implementation of the present subject matter, the managing engines 106, while assisting the developing systems 102 and the client device 104, may also communicate with a managing server 114. The managing server 114 may manage the one or more managing engines 106 of the developing systems 102 and the client device 104. In an example, the managing server 114 may be a server, hosting an application, and managing execution and communication of managing engines 106. In an example, the managing server 114 may be implemented as a central directory server, a database server, a web server, or an application server.

A web-based service may be developed on the developing systems 102. Several developers may work together, and may utilize the developing systems 102 for developing the web-based service. In operation, the developing systems 102 may receive requests for development of the web-based services from the client device 104. When a request for developing web-based application is received, the managing engines 106 may access assemblies, necessitated for development of the web-based service. In as example, the determination of the assemblies may be completed by the managing server 114, and the required assemblies may be accessed from the collaborative platform 110. The assemblies may comprise, such as generic library or any other prerequisite, needed for development of the web-based service. The assemblies or libraries, as explained earlier may be any of the form such as, JS, CSS, and HTML, as needed by the web-based service.

Thereafter, developers may work together on the developing systems 102 for developing the web-based service. When a web-based service is being developed, developers at the developers systems 102 may provide multiple inputs indicating the additions and/or changes to be done on the web-based service. For the purpose of review and receiving inputs, the web-based service may also be provided to the client, in real-time, through the collaborative platform 110. The client device 104 may access the collaborative platform 110 for review. After reviewing, the client may also provide suggestive inputs for the web-based service, in real-time.

In an example implementation of the present subject matter, the managing engine 104-3 of the client system 104, capture the suggestive changes provided by the client. The managing engine 104-3 thereafter identify a design requirements of the web-based service, based on the suggestive changes of the client. It is to be noted that the developer may also provide any inputs for changing a functionality of a web-based service. The managing engines 104-1 and 104-2 of the developing systems 102, may also capture the inputs and determines the design requirement. The design requirement may be understood as the various requirements, such as libraries, source codes, language codes etc. required for conforming the inputs provided by the client or the developers.

It may be noted that the identifying of the inputs of the developers and client occurs in real-time and the design requirement is determined simultaneously, i.e., if the inputs provided by the client or developer changes, the design requirement changes accordingly. The managing engines 106-1, 106-2, and 106-3 thereafter may determine the component package in accordance with the design requirements. The component package may be understood as a collection of executable modules, which when executed fulfills the design requirements of the web-based service. For example, the component package may include templates or layouts available on the collaborative platform, managing engine, or it may include libraries, language code, resources etc., that are needed to implement the inputs provided by the client or developer.

The managing engine may then request the component package form the managing server 114. The managing server 114 derives or retrieves the component package from a computer distributed network (CDN) 112. The CDN 112, in an example may be hosted on a platform service of a third party, such as the Microsoft® Azure. Azure may provide either Platform as a service (PaaS), or Infrastructure as service (IaaS) and may support many different programming languages, communication formats, tools and frameworks, including both Microsoft-specific and third-party software and systems.

Thus, the managing engines 106 of the developing systems 102 may capture the inputs provided by the developers and the managing engine 106-3 may capture the inputs provided by the client, and in real-time may identify the component package and request the same from the managing server 114. The managing engines 106 after receiving the component package, may commit the changes on the web-based service.

Figure 2:
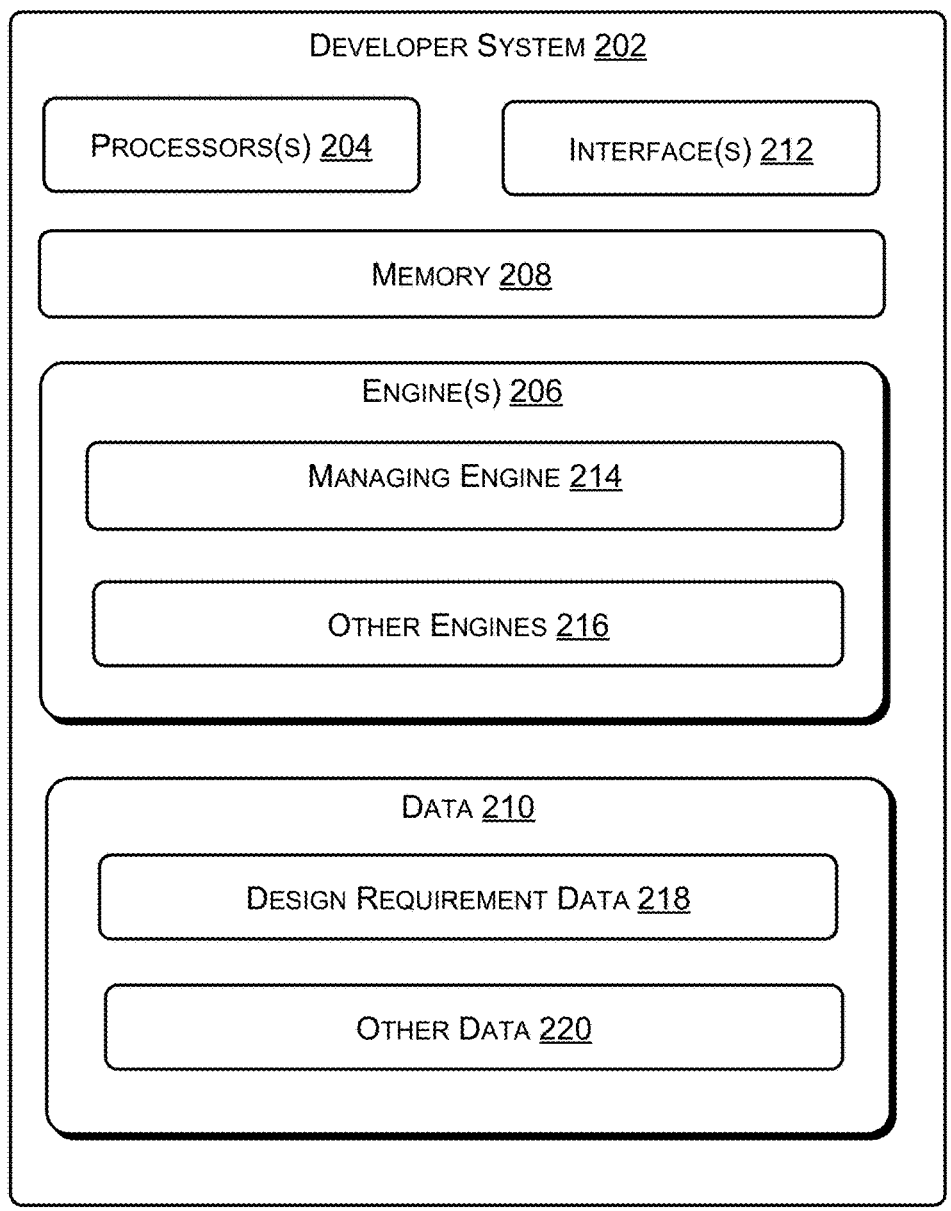
FIG. 2 illustrate a client system for collaborative development of web-based services, according to an example implementation of the present subject matter.

FIG. 2 illustrate a developer system 202, for collaborative development of wed-based services. The developer system 202 may refer to any of the developing systems 102, including the client system 104, as described in FIG. 1. The FIG. 2 shows various components of the developer system 202, according to an example implementation of the present subject matter.

The developer system 202, among other things, may include a processor(s) 204, engine(s) 206, memory 208, data 210 and interface(s) 212. The processor(s) 204, among other capabilities, may fetch and execute computer-readable instructions stored in the memory. The memory 208, communicatively coupled to the processor(s) 204, may include a non-transitory computer-readable medium including, for example, volatile memory, such as Static Random Access Memory (SRAM) and Dynamic Random Access Memory (DRAM), and/or non-volatile memory, such as Read-Only-Memory (ROM), erasable programmable ROM, flash memories, hard disks, optical disks, and magnetic tapes. The developer system may be accessed by the developer for developing the web-based service and is also accessed by the client for reviewing the web-based service.

As mentioned earlier, the developer system 202 may include the engine(s) 206. In an example implementation of the present subject matter the developer system 202 may include the managing engine 214 and other engine(s) 216. The other engines(s) 216 may include computer-readable instructions that supplement applications or functions performed by the client system 202. Further a data 210 may include design requirement data 218 and other data 220. The other data may include data generated and saved by the engine(s) for providing various functionalities to the developer system 202.

As mentioned earlier the managing engine 214 may access the collaborative platform 110 via the network 108. The managing engine 214 may be referred to as the managing engine 106 of the developing system 102, as described in FIG. 1. The developers may work together on multiple developer system and provide inputs indicating a change in the web-based service, and also a client may review the web-based service and provide suggestive inputs indicating the changes on the web-based service on the client system 104.

In an example implementation, the client may provide multiple suggestive inputs on the web-based service, through the collaborative platform 110. For instance, the client may select a page layout from the list of available page layouts. The client may also customize the web-based services according to his requirement, such as, edit a page layout, or create a new web site.

In another example, the client may drag and drop a website template from a list of available templates, or may edit a website template. In a yet another example, the client may change a theme of the web-based service. In addition to the inputs provided by the client, the developers may also provide inputs for the web-based service. The managing 214 engine also enable the developers to create a master page where one may manage site templates available.

As mentioned earlier, there may be multiple developers involved in the development of the web-based service. The developers accessing the web-based service on the collaborative platform 110 may have assigned level of access to web-based service and accordingly perform actions based on the level of access provided to them. For example, an administrator possessing rights for full administration; a partner possessing rights for managing tenants; a supervisor possessing rights to create websites, web layouts, and manage other users; an advanced user possessing rights to create a collection of websites and website templates; a basic user possessing rights to create web sites and web layouts, and a restricted user possessing rights to provide technical support or a user (client) simply to provide inputs about the design and other aspects of the web-based service. Accordingly, the developers may provide their inputs in accordance with the role assigned to them.

In an example implementation of the present subject matter, the managing engine 214 may utilize optimistic concurrency control for committing changes to the web-based services. That is multiple developers may work on the web-based service at the same time and may provide updates to the web-based service simultaneously. Thus the managing engine 214 enables parallel development and enable parallel updates to be performed on the web-based service. For, example simultaneously an input for changing a page layout and an input for changing a site template may be provided by two different developers. This may avoid situations where the web-based service is locked by one developer during an action. Further, the optimistic concurrency control may enable updates to be implemented concurrently.

As the inputs are being provided by the developer or client, the managing engine 214 identifies the design requirements of the web-based service being developed on the developer system 202. The design requirement may be such as, the layouts, the libraries, or the source codes required by the web-based service to implement the change indicated by the input. For example, if the client provides some inputs on the layout and site template of the web-based service, the design requirement may be, such as language code, libraries etc., required for conforming the change suggested by the client.

The managing engine 214 identifies the design requirements of the web-based service and save them as the design requirement data. The managing engine 214 then requests the component package from the managing server 114.

Component package may be understood as the complete package of executable modules which when executed provide functionalities to meet the design requirements of the web-based service. In other words the managing engine 214 provides the design requirement data to the managing server 106 and the managing server 106 based on the request and the design requirement data provides the component package to the managing engine 214. The component package, as received by the managing engine 214, may be deployed on the web-based services as client side object model (CSOM) based application programming interface (API) of the collaborative platform 112. The identification of the design requirement and retrieving of the component package is done in real time so that the developer or client needs only to provide the inputs indicating the change in the design and the component package is simultaneously retrieved and then deployed on the collaborative platform. The component package may include executable modules that fulfils design requirements and are executed to implement the inputs provided by the client or the developer.

Considering an example, the managing engine 214 of the present subject matter may enable identifying of design requirement of the web-based service and may also provide the component package for implementing the change. The web-based service may be deployed on the collaborative platform 110 for client to review. In an example, the collaborative platform may be Microsoft® SharePoint®, which may be provided along with Microsoft® 365 package.

The deployment of the web-service on the Microsoft® SharePoint® may be based on the API CSOM of SharePoint. The deployment of the web-based services may create a structure of the web-service and enable drop different widgets on the collaborative platform 110, such as the Microsoft® SharePoint®. The widget may contain code to interact with various APIs, such as yammer, delve, Facebook, and Twitter. In an example, if the deployment of the web-based service on the Microsoft® SharePoint® requires access to any other environment such as, yammer, the client can access them using the drop widget.

A customer using the Microsoft® SharePoint® is generally referred to as a tenant. Thus, the client providing his feedback on the web-based services may also be referred to, and understood as a tenant. The developers may develop the web-based service, and may deploys the web-based service on the collaborative platform 110, such as the Microsoft® SharePoint®. Thereafter, the client may access the web-service by accessing the collaborative platform 110 and may provide inputs regarding any change in the web-service by any of the methods as described earlier.

As described earlier, the managing engine 214, may request the component package from the managing server 114, and the managing server 114 in response provides the component package to the managing engine 214. The managing server 114, in an example, may retrieve the component package from the CDN. The CDN may be hosted on a cloud based platform, such as the Microsoft Azure.

Figure 3:
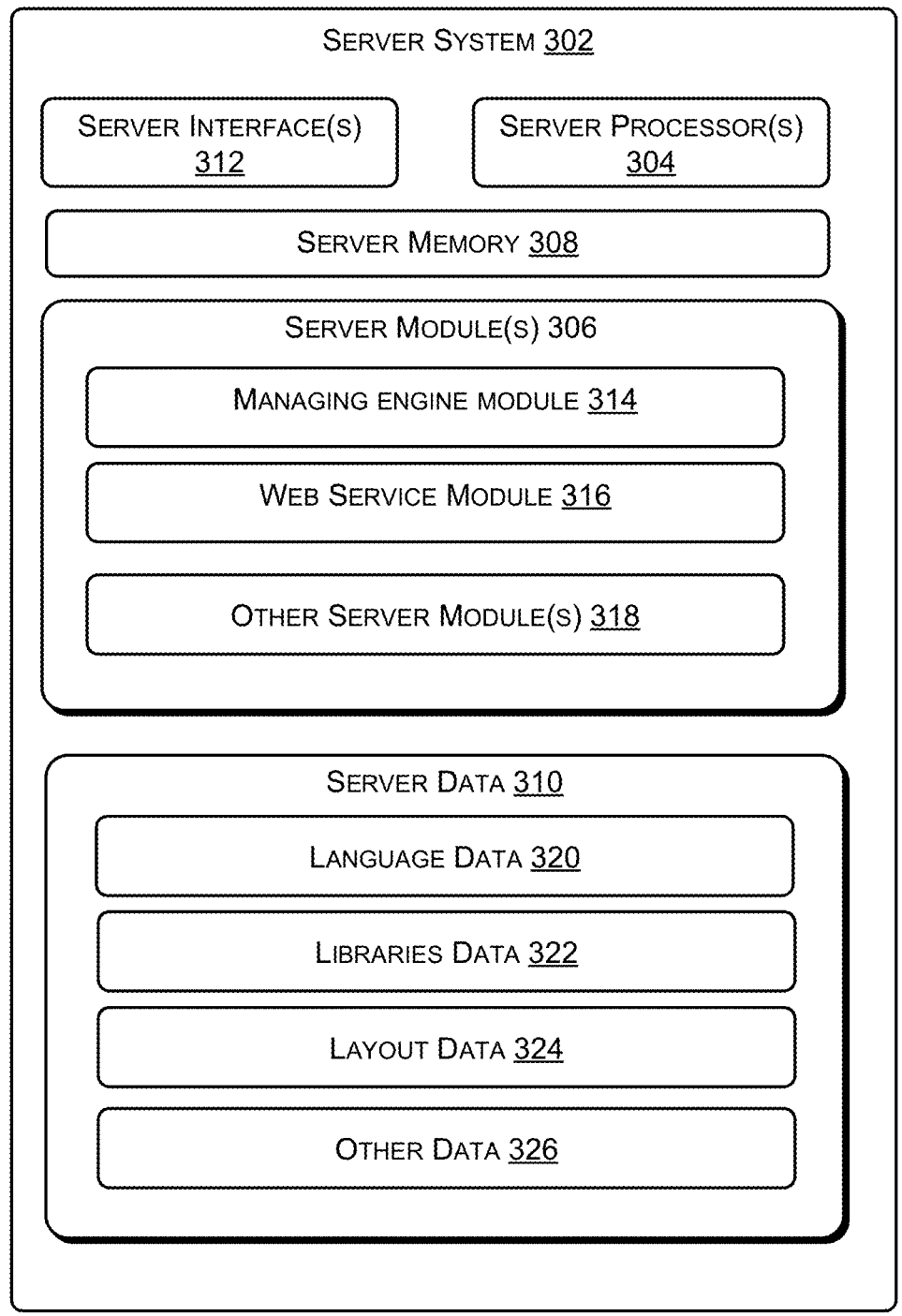
FIG. 3 illustrates a server system for collaborative development of web-based services, according to an example of the present subject matter.

FIG. 3 illustrates a server system 302, for collaborative development of the web-based service. The FIG. 3 shows various components of the server system, according to an example of the present subject matter. The server system 302, among other things, may include sever processor(s) 304, server module(s) 306, server memory 308, server data 310, and server interface(s) 312. The server processor(s) 304, among other capabilities, may fetch and execute computer-readable instructions stored in the server memory 308. The server memory 308 is communicatively coupled to the server processor(s) 304, may include a non-transitory computer-readable medium including, for example, volatile memory, such as Static Random Access Memory (SRAM) and Dynamic Random Access Memory (DRAM), and/or non-volatile memory, such as Read-Only-Memory (ROM), erasable programmable ROM, flash memories, hard disks, optical disks, and magnetic tapes.

The server system 302 is an example implementation of the managing server 108 as shown in FIG. 1. The server module(s) 306 may comprise a managing engine module 314 to communicate with the managing engine 214 of the developer system 202 and a collaboration platform module 316 to communicate with collaborative platform 110 and other server module(s) 318. The other server module(s) 318 may include computer-readable instructions that supplement applications or functions performed by the developer system 202. Further, the server data 310 may include a language data 320, libraries data 322, a layout data 324 and other data 326. The other server data 326 may include data generated and saved by the server module(s) 306 for providing various functionalities to the server system 302.

As understood, the server system 302 is communicatively coupled to the computer distributed network (CDN) 116 and the collaborative platform 110 via the network 108, as described in FIG. 1. The managing engine 214 as described in FIG. 2 requests a component package from the managing server 106. The server system 302 being described here with reference to FIG. 3 enables receiving of the request from the managing engine 214 and also enables the managing server 106 to provide component package to the managing engine 214.

In an example, when an input is received by the developer system 202, the managing engine 214 determines the design requirement and stores the same as design requirement data, as explained with reference with FIG. 2. For example, consider the client provides an input regarding the change in a page layout and site template of the web based service. The managing engine 214 may capture the input and identify the design requirement for implementing the input. The managing engine may then request a component package from the managing server 108, which is received by the server system 302, on its managing engine module 314.

The server system 302, receives the requests for component package from the managing engine 214 on the managing engine module 314. The request for the component package is received by the server system 302 in the form of the design requirement data. The design requirement data provides the requirement for implementing the change. Considering the example in the above para, when the client provides inputs for changing a page layout and site template, the language codes, libraries, source codes required to conform the changes may be is design requirement data. This requirement is received by the server system 302 on its managing engine module 314. The server system 302 then fetches the component package from the CDN 116. The component package contains executable modules, comprising the assemblies, language code, libraries, source codes, layouts, site templates etc., as required and as indicated in the design requirement data. The data corresponding to the component package may be saved as language data 320, which may store the language files retrieved from the CDN 116, layout data 322 which may store various layouts to be used for web-based service.

In one implementation the server system 302 may also retrieve assembly data 324 from the collaborative platform 112, such as generic assemblies, that are to be used for the web-based service. In one implementation, the server system 302 may also retrieve page layout available on the collaborative platform 112. All the data, assembly data, language data, web layout data, required in accordance with a design requirement data, together comprises component package. It is to be noted that the request from the managing engine 214 for, the component package, may denote the various requirement for the web application interface, such as language to be used, libraries to be executed for implementing various functionalities of the web-based service. In an example implementation of the present subject matter, the server system 302 may retrieve various data and provide this data to the managing engine 214 as the component package.

It is to be note that the component package is being provided in real-time to the managing engine 214, thus if the inputs for a change in the web-based service changes, the design requirement data changes accordingly and accordingly, the component package being retrieved may also change. In an example, the server system 302, may be hosted on a platform as a service, such as Microsoft® Azure platform. The server system 302, in an example, may detect the design requirement based on the source of the request. The design requirement may either be received from a client device, or from a developer system. The server system 302, in this case, may identify the source of the request (e.g., URL) to identify the source of the request. After the source is identified, the serve system 302 may return the component package in JS/HTML/CSS depending on the context of the request made.

For example, the managing engine 214 may request the component package from the server system 302, based on the design requirements of the web-based service. In case the design requirement requires a library in HTML format, the server system 302 may request the corresponding library from the CDN, in HTML format. The server system 302, thereafter, may provide the library in the HTML format to the managing engine 214.

Figure 4:
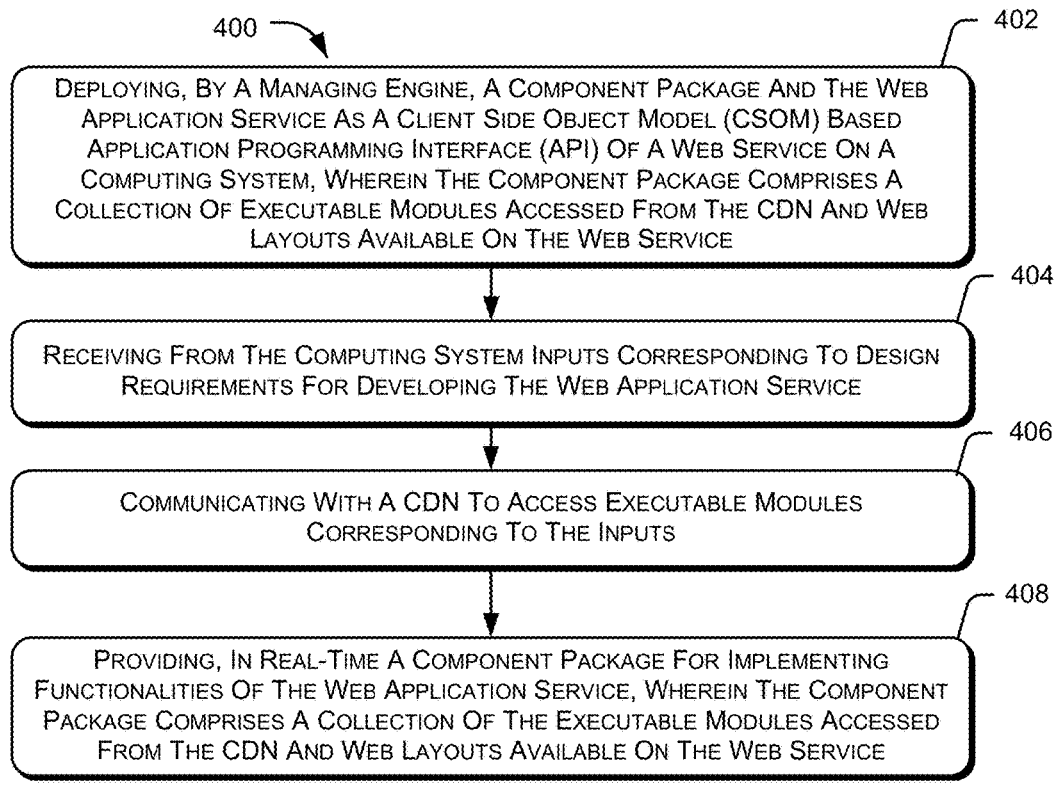
FIG. 4 is a method figure for collaborative development of the web application interface for collaborative development of web-based services, according to an example of the present subject matter.

Method 400 is described in FIG. 4 for providing a collaborative development of the web-based service, according to an example of the present subject matter. The order in which the method 400 is described is not intended to be construed as a limitation, and any number of the described method blocks may be combined in any appropriate order to execute the method 400 or an alternative method. Additionally, individual blocks may be deleted from the method 400 without departing from the spirit and scope of the subject matter described herein.

The method 400 may be performed by programmed computing devices, for example, based on instructions retrieved from non-transitory computer readable media. The computer readable media may include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIG. 4, at block 402, the inputs, corresponding to design requirements, provided by the computing system are received for developing the web-based service. The computing system here may be, such as developer system 202 or client system 104 that may provide inputs for we-based service.

At block 404, the managing server communicates CDN to access executable modules corresponding to the inputs. These executable files are executed to provide functionalities to the web application interface.

At block 406, the component package for implementing functionalities of the web-based service is provided in real time, as explained, the component package comprises a collection of the executable modules accessed from the CDN and web layouts available on the collaborative platform.

At block 408 the component package is deployed as a client side object model (CSOM) based application programming interface (API) of a collaborative platform on a computing system, wherein the component package comprises a collection of executable modules accessed from the CDN. In an example, the collaborative platform may be Microsoft® Sharepoint® and the CDN may be hosted on the Azure platform of the Microsoft®.

Figure 5:
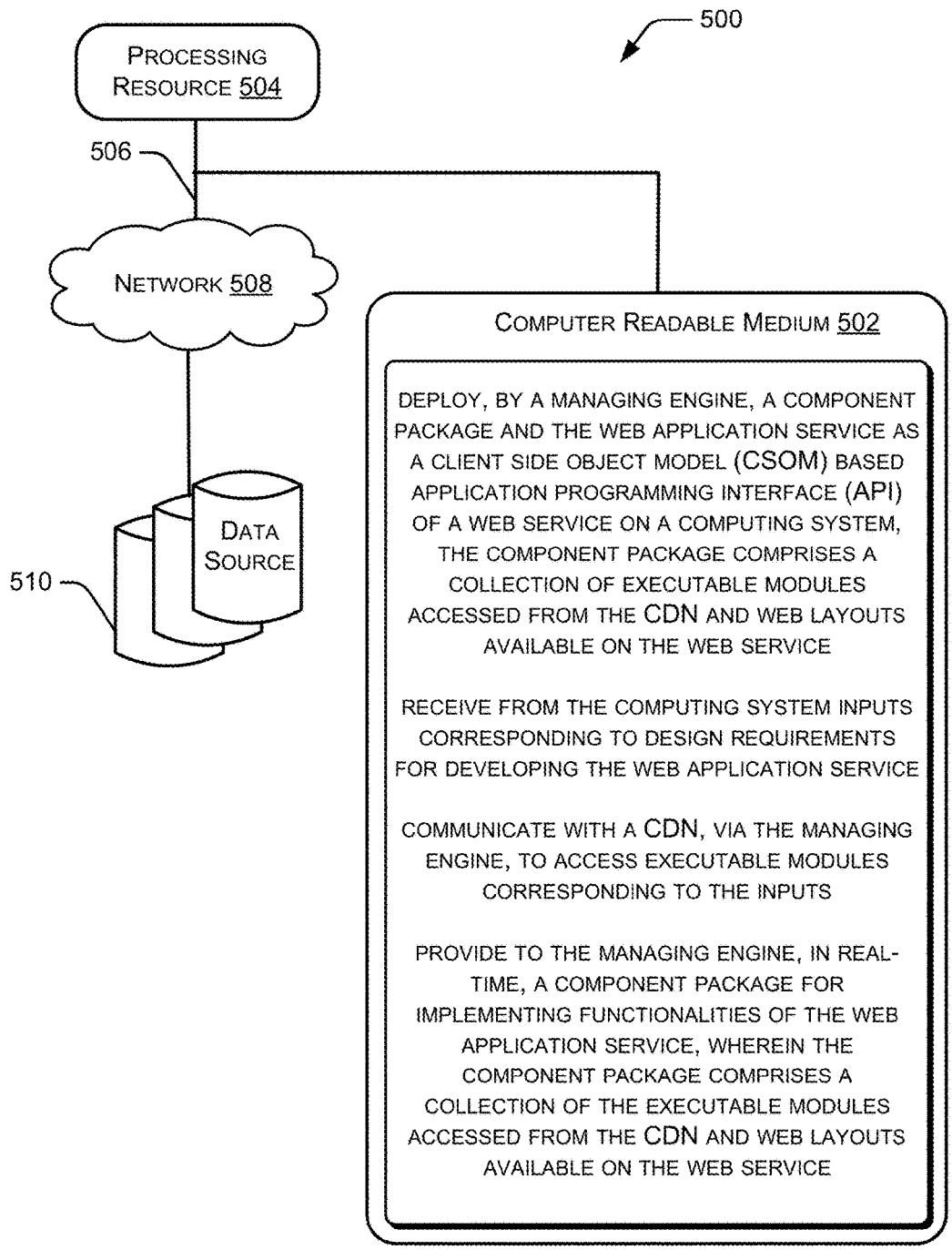
FIG. 5 illustrates an example network environment implementing a non-transitory computer readable medium for collaborative development of web-based services, according to an example of the present subject matter.

FIG. 5 illustrates an example network environment 500 using a non-transitory computer readable medium 502 for collaborative web-based service development, according to an example of the present subject matter. The network environment 500 may be a public networking environment or a private networking environment. In one example, the network environment 500 includes a processing resource 504 communicatively coupled to the non-transitory computer readable medium 502 through a communication link 506.

For example, the processing resource 504 may be a processor of a computing system, such as the client system 202. The non-transitory computer readable medium 502 may be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 may access the non-transitory computer readable medium 502 through a network 508. The network 508 may be a single network or a combination of multiple networks and may use a variety of communication protocols.

The processing resource 504 and the non-transitory computer readable medium 502 may also be communicatively coupled to data sources 510 over the network 508. The data sources 510 may include, for example, databases and computing devices. The data sources 510 may be used by the database administrators and other users to communicate with the processing resource 504.

In one example, the non-transitory computer readable medium 502 includes a set of computer readable instructions. The set of computer readable instructions, referred to as instructions hereinafter, may be accessed by the processing resource 504 through the communication link 506 and subsequently executed to perform acts for collaborative web-based service.

For discussion purposes, the execution of the instructions by the processing resource has been described with reference to various components introduced earlier with reference to description of FIG. 3 and FIG. 4.

On execution by the processing resource 504, inputs corresponding to design requirements for developing the web-based service is received from the computing system, such as developer system 202. Thereafter the managing server communicates with the CDN 116 to access executable modules corresponding to the inputs indicating the change on the web-based service.

When the data related to the executable modules have been retrieved by the managing server, the same is packed together with the assemblies of the collaborative platform and the whole package, known as the component package, is provided to the managing engine 214, which provides implementation of functionalities for meeting the design requirements of the web-based service. The component package is provided to the managing engine 214 in real-time for implementing functionalities of the web-based service, whereas the functionalities are defined by the input indicating the changes on the web-based service.

Although examples for collaborative development of a web-based service have been described in language specific to structural features and/or methods, it is to be understood that the appended claims are not limited to the specific features or methods described. Rather, the specific features and methods are disclosed as examples for the present subject matter.

We claim:

1. A system for collaborative development of a web-based service, the system comprising:
   a processor;
   a managing engine, coupled to the processor, to
   access assemblies to be utilized for the collaborative development of the web-based service;
   to capture user requirements received from a user;
   to identify simultaneously corresponding design requirements based on said user requirements, wherein the design requirements are to implement functionalities of the web-based service, wherein the design requirements are at least one of layouts, libraries, language codes or source codes required by the web-based service to implement functionalities corresponding to the user requirements;
   communicating with a CDN to access executable modules corresponding to the design requirements;
   providing, in real-time, a component package for implementing functionalities of the web-based service, wherein the component package comprises a collection of the executable modules accessed from the CDN and web layouts available on the collaborative platform; and deploying, by the managing engine, the component package as a client side object model (CSOM) based application programming interface (API) of a collaborative platform on a computing system, wherein the component package comprises source files that are accessed from the CDN.

2. The system as claimed in claim 1 further comprising, validating the commit by initializing a test execution of the web-based service on the system.

3. The system as claimed in claim 1, wherein the managing engine accesses a collaborative platform to obtain assemblies to be utilized for the collaborative development of the web-based service.

4. The system as claimed in claim 1, wherein the web-based service is one of a website, a web portal, a web mail, and a web browser.

5. The system as claimed in claim 3, wherein access to the web-based service on the collaborative platform is provided based on a privilege level assigned to a user.

6. The system as claimed in claim 1, wherein the executable modules comprise any of an instruction set for implementing functionalities of the web-based service, layouts related to design of the web-based service, and data related to hierarchy of executable modules.

7. The system as claimed in claim 1, wherein the assemblies include at least one of a generic library assembly and an execution assembly to be executed in a compiled runtime environment for implementing the web-based service.

8. A method of providing a platform for collaboratively developing a web-based service, the method comprising,
receiving, from a computing system, user requirements;
identifying simultaneously corresponding design requirements for developing the web-based service, wherein the design requirements are at least one of layouts, libraries, language codes, or source codes required by the web-based service to implement functionalities corresponding to the user requirements;
communicating with a CDN to access executable modules corresponding to the design requirements;
providing, in real-time, a component package for implementing functionalities of the web-based service, wherein the component package comprises a collection of the executable modules accessed from the CDN and web layouts available on the collaborative platform; and
deploying, by a managing engine, the component package as a client side object model (CSOM) based application programming interface (API) of a collaborative platform on a computing system, wherein the component package comprises source files that are accessed from the CDN.

9. The method as claimed in claim 8, wherein the web-based service is one of a website, a web portal, a web mail, and a web browser.

10. The method as claimed in claim 8, wherein access to the web-based service on the collaborative platform is provided based on a pre-defined privilege level assigned to a user, wherein the pre-defined privilege level corresponds to roles of the user, and wherein the roles of the users are from amongst, an administrator possessing rights for full administration; a partner possessing rights for managing tenants; a supervisor possessing rights to create websites, web layouts, and manage other users; an advanced user possessing rights to create a collection of websites and website templates; a basic user possessing rights to create web sites and web layouts, and a restricted user possessing rights to provide technical support.

11. The method as claimed in claim 8, wherein the collaborative platform provides content management support including at least one of, site creation for different tenants, work-flow set up, customization of designs and web layouts, and visualization of workflows for developing the web-based service collaboratively.

12. The method as claimed in claim 8, wherein the collaborative platform provides assemblies utilized for developing the web-based service.

13. The method claimed in claim 8 further comprising, receiving a commit indicative of an update based on the component package for developing the web-based service.

14. The method as claimed in claim 8, wherein the source files comprise any of an instruction set for implementing functionalities of the web-based service, layouts related to design of the web-based service, and data related to hierarchy of source files.

15. The method as claimed in claim 13, wherein the update for developing the web-based service is based on an optimistic concurrency control supported by the computing system, and wherein the optimistic concurrency control provides for parallel updates on the web-based service by multiple users.

16. A non-transitory computer readable medium comprising instructions executable by a processor to:
receive, from a computing system, user requirements;
identify simultaneously corresponding design requirements for developing the web-based service, wherein the design requirements are at least one of layouts, libraries, language codes, or source codes required by the web-based service to implement functionalities corresponding to the user requirements;
communicate with a CDN, via the managing engine, to access executable modules corresponding to the design requirements;
provide to the managing engine, in real-time, a component package for implementing functionalities of the web-based service, wherein the component package comprises a collection of the executable modules accessed from the CDN and web layouts available on the collaborative platform; and
deploy, by a managing engine, the component package and the web-based service as a client side object model (CSOM) based application programming interface (API) of a collaborative platform on a computing system, wherein the component package comprises source files that are accessed from the CDN.

* * * * *